(12) United States Patent
Kennedy et al.

(10) Patent No.: US 7,823,290 B2
(45) Date of Patent: Nov. 2, 2010

(54) METHOD OF FORMING A HUB FOR USE IN A DISK DRIVE MOTOR

(75) Inventors: Michael D. Kennedy, Boulder Creek, CA (US); Roger A. Addy, Gilroy, CA (US); Alan L. Grantz, Aptos, CA (US); Norbert S. Parsoneault, Scotts Valley, CA (US); Wesley R. Clark, Watsonville, CA (US); Matt L. Shumway, Edina, MN (US); Ronald T. Albo, Campbell, CA (US)

(73) Assignee: Seagate Technology, Inc., Scotts Valley, CA (US)

( * ) Notice: Subject to any disclaimer, the term of this patent is extended or adjusted under 35 U.S.C. 154(b) by 11 days.

(21) Appl. No.: 12/133,236

(22) Filed: Jun. 4, 2008

(65) Prior Publication Data

US 2008/0229582 A1 Sep. 25, 2008

Related U.S. Application Data

(62) Division of application No. 11/144,538, filed on Jun. 3, 2005, now Pat. No. 7,390,125, which is a division of application No. 10/693,141, filed on Apr. 26, 2004, now abandoned, which is a division of application No. 09/498,700, filed on Feb. 7, 2000, now Pat. No. 6,755, 570.

(60) Provisional application No. 60/138,945, filed on Jun. 11, 1999.

(51) Int. Cl.
*B23P 17/00* (2006.01)
*B23P 13/00* (2006.01)
(52) U.S. Cl. .................... 29/898.02; 29/898.05; 29/557
(58) Field of Classification Search .............. 29/898.02, 29/898.056, 557; 451/51, 52; 384/110
See application file for complete search history.

(56) References Cited

U.S. PATENT DOCUMENTS

| 2,574,793 | A | * | 11/1951 | Maracz | .................. 451/51 |
| 3,990,141 | A | | 11/1976 | Stark | |
| 4,386,483 | A | * | 6/1983 | Schlaefli | ............... 451/58 |
| 5,305,163 | A | | 4/1994 | Holm | |
| 5,873,657 | A | | 2/1999 | Lee | |
| 5,947,608 | A | | 9/1999 | Kim | |

FOREIGN PATENT DOCUMENTS

JP 62074512 A * 4/1987

* cited by examiner

*Primary Examiner*—Jermie E Cozart
(74) *Attorney, Agent, or Firm*—David K. Lucente

(57) ABSTRACT

Methods of machining a single piece hub with integral upper and lower female cones includes providing a single piece hub with upper and lower conical voids having respective narrow ends proximal each other and respective wide ends distal each other. Surfaces of the voids are machined using a tool provided from a single side of the hub that is dimensioned to fit through an opening defined by the interface between the narrow ends of the conical void. The tool can be moved parallel to a rotational axis for accessing conical surfaces of both voids and perpendicular to the rotational axis while contacting the surfaces so as to produce a final machined surface.

19 Claims, 4 Drawing Sheets

METHOD OF FORMING A HUB FOR USE IN A DISK DRIVE MOTOR

CROSS-REFERENCE TO RELATED APPLICATIONS

This application is a divisional application of application Ser. No. 11/144,538 filed on Jun. 3, 2005, which has issued as U.S. Pat. No. 7,390,125 and incorporated herein by reference. Application Ser. No. 11/144,538 is a divisional of Ser. No. 10/693,141 filed on Apr. 26, 2004, which has been abandoned, and is incorporated herein by reference. Application Ser. No. 10/693,141 is a divisional of application Ser. No. 09/498,700 filed on Feb. 7, 2000, which has issued as U.S. Pat. No. 6,755,570, and is incorporated herein by reference. Application Ser. No. 09/498,700 claims priority from U.S. provisional application Ser. No. 60/138,945 filed on Jun. 11, 1999 and incorporated herein by reference.

FIELD OF THE INVENTION

The present invention relates to the field of fluid dynamic bearings, and more specifically to a process for accurately cutting the conical surfaces into a hub to define the hub faces for a conical bearing, so that the motor hub is designed as a single component.

BACKGROUND OF THE INVENTION

Fluid dynamic bearings have come into increasingly widespread use, especially in fields where the stability of the shaft and bearing assembly is of critical importance, such as in the field of disk drives and the like. Ball bearing assemblies have many mechanical problems such as wear, run-out and manufacturing difficulties. Moreover, resistance to operating shock and vibration is poor because of flow damping. Thus, fluid dynamic bearings where in a lubricating fluid such as gas or liquid or air provides a bearing surface between a fixed member of the housing and a relatively rotating member have come into increasingly wide-spread use. Such fluid dynamic bearings spread the bearing surface over a large continuous area in comparison with the ball bearing assembly which comprises a series of point interfaces. This is desirable because the increased bearing surfaces reduce wobble or run-out between the rotating and fixed members. Further, improved shock resistance and readiness is achieved with a fluid dynamic bearing. Also, the use of fluid in the interface area imparts damping effects to the bearing.

An especially desirable design is a conical bearing, as a single bearing or a pair of facing bearings can impart substantial radial and axial stability to a system.

However, due to nominal gaps in a conical fluid bearing on the order of 1 to 3 microns, precise size and positional control must be maintained during component fabrication and assembly. If not done, the assembled components will not have the proper geometric relationships necessary to produce a functional air bearing when the parts rotate at the operating speed.

SUMMARY OF THE INVENTION

For purposes of this description, a dual conical fluid bearing spindle includes four basic components. These components are the upper male cone/shaft, the upper female cone, the lower male cone/shaft and the lower female cone. According to the present invention, the upper and lower female cones are integrated into a single part, more specifically the hub. This hub, in designs of a disk drive or the like where the shaft is fixed, may support an external flange for supporting one or more disks for rotation with the hub.

To simplify fabrication of this integral hub piece, the opening between the upper and lower female cones in this hub has sufficient width or radial dimension to allow access to both cones from one side of the hub with the cutting tool. A cutting tool is used which has a width smaller than the opening between the cones. Preferably, the tool has a width which is about equal to or smaller than an angular dimension through this opening which is defined by extending surfaces of the upper and lower female cones. If this limitation is satisfied, both cones can be created with a single machine set up operating from one side of the integrated hub.

Preferably the tool should only move orthogonal or parallel to the cutting tools rotational center axis.

This assembly design and fabrication technique eliminates the tolerance accumulation associated with the assembly of separate upper and lower female cones. Further, since the component manufacturing operation is done on the same machine set-up, there will be no error associated with rechucking the hub between two separate fabrication operations.

Other features and advantages of the present invention will become apparent to a person of skill in the art who studies the following invention disclosure given in association with the following set of drawings.

DETAILED DESCRIPTION OF A PREFERRED EMBODIMENT

Figure 1A:
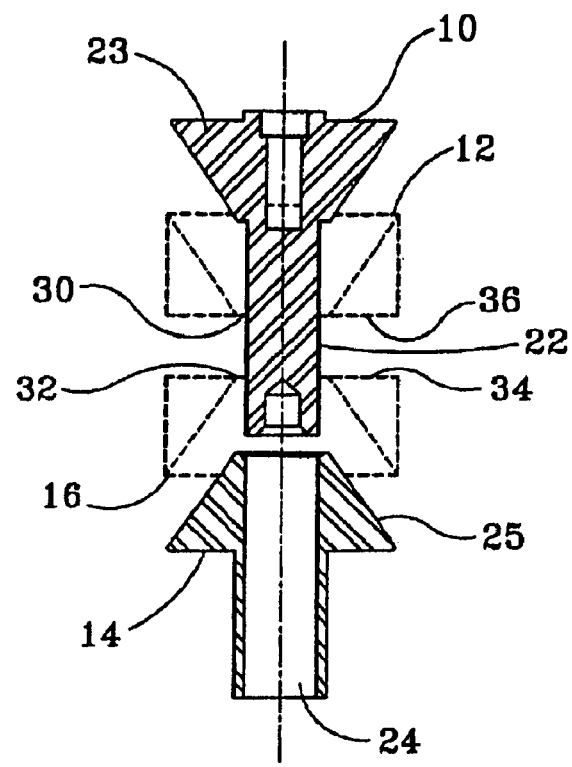
FIGS. 1A and 1B are exploded views of the basic components of a dual cone fluid dynamic bearing.
Figure 1B:
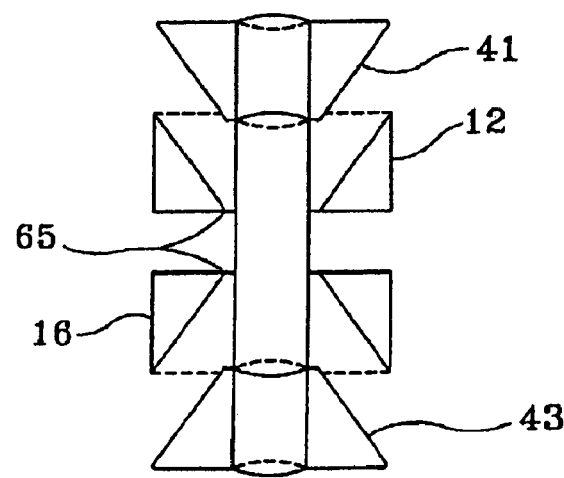
Figure 2:
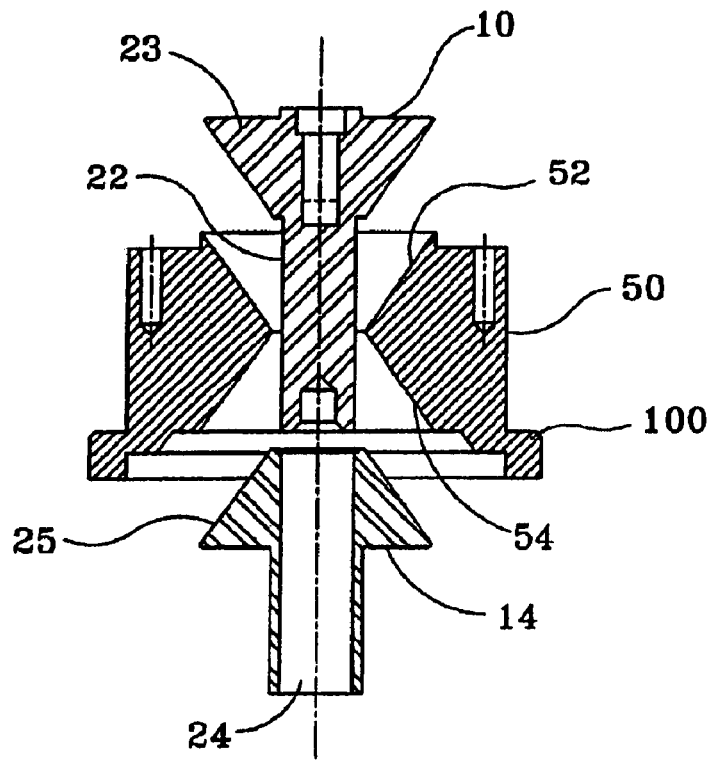
FIG. 2 is a modified version of FIG. 1 showing in this instance the integrated upper and lower female cones which are a subject of the present invention.

A typical conical fluid bearing spindle has the basic parts shown in FIG. 1A comprising an upper male cone/shaft element 10, an upper female cone 12, a lower male cone/shaft element 14 and a lower female cone 16. Typically, each of these pieces is separately fabricated. The pieces can then be assembled by joining the upper and lower female cones 12, 16. The shaft 22 of the upper male cone/shaft 10 is then inserted into the bore 24 of the lower male cone/shaft 14. Prior to doing this, of course, the upper female cone 12 and lower female cone 16 must be joined together, perfectly aligned. A further alternative appears in FIG. 1B where the male cones slide over or are otherwise fitted on a shaft which is inserted through the openings 65 in the cone sections 12, 16 which are joined as above. Due to the nominal gaps in a conical fluid bearing being on the order of 1 to 3 microns, precise size and positional control must be maintained during component fabrication and assembly. If not, the assembled components will not have the proper geometric relationships necessary to produce a bearing when the parts rotate at operating speed. Fabrication technology does exist to manufacture each of the individual components of FIGS. 1A and 1B to a high degree of precision. However, it is evident that to improve the positional control of the components in the assembly, that it would be highly desirable to produce an integrated hub 50 as shown in FIG. 2. This integrated hub would include both the upper and lower female cones 52, 54, respectively integrated into a single part.

Figure 3:
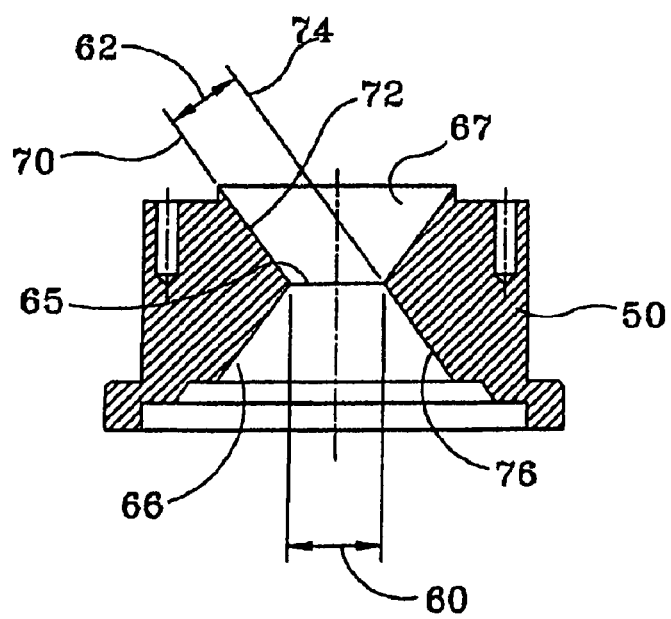
FIG. 3 is a vertical section of the integrated hub comprising the upper and lower female cones and with the essential dimensions of the present invention illustrated.

The successful final machining process for this single piece hub 50 shown in its rough cast or machined form in FIG. 3 relies primarily on two dimensions marked as 60 and 62 in FIG. 3. Dimension 60 is the radial width of the opening 65 between the upper and lower female cones; dimension 62 is the angular width of the opening, which may be defined as the distance between two lines which extend from inner surfaces of the cone. The dimension 60 is set large enough to allow the shaft of the combination cones/shaft 10, FIG. 2 to pass through the opening 60. In the present example, the shaft 22 is shown attached to the cone 23; obviously, the shaft could equally well be attached to the lower cones/shaft 14 with the bore 24 appearing in the upper male cones/shaft 10. In a further alternative, the dimension 60 could be set large enough to allow for joinder of two mating surfaces of an upper and lower male cone 41, 43 as in FIGS. 1A and 1B. However, such an approach is more difficult to assemble accurately and stabilize as the two pieces must be joined inside the integral hub 50.

The critical dimension is the dimension 62 which is the dimension defined at the center line 65 of the opening between the upper 67 and lower 66 cone openings in the integral hub piece 50. The dimension 62 is defined and extends between a first line 70 drawn colinear with the conical surface of the upper cone and a second line 74 drawn parallel to line 70 and colinear with the conical surface of the lower hub female cone 76.

Figure 4:
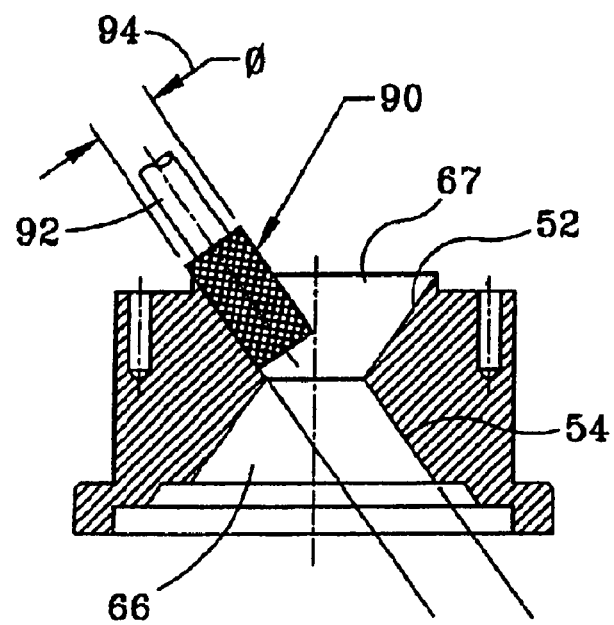
FIG. 4 is a vertical sectional view similar to the view of FIG. 3 illustrating the cutting tool, the width of the opening, and the width of the tool which is used to cut both the upper and lower cones according to the present invention.
Figure 5:
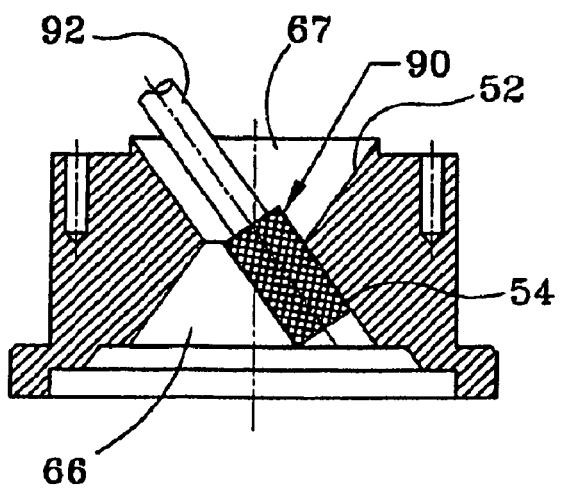
FIG. 5 is a modified version of FIG. 4 showing cutting of the lower cone of the integrated cones.

The significance of this dimension 62 becomes apparent from a comparison of FIGS. 4 and 5 which show the use of an exemplary tool for cutting on the surfaces 52, 54 of the upper and lower cones 67, 66. This tool 90 mounted on a support shaft 92 is designed to have a width 94 which is less than (or about equal to) the dimension 62 (FIG. 3) defined by the opening between the two surfaces 72, 76 (FIG. 3). It is evident from a comparison of the figures that the dimension 94, which represents the width of the tool, must be less than or about equal to the dimension 62 which is the angular width of the opening defined by the lines 70, 74 extending parallel to selected parallel surfaces of the upper and lower cones. In this way, the tool 90 may first cut the surface 52 of the upper cone, and then be pushed through the opening 65 to cut the surface 54 of the lower cone 66. By adopting this approach, access to both cones 66, 67 from one side of the hub is achieved. With a cutting tool 90 having a dimension 94 less than the critical angular opening dimension 62, both female cones 66, 67 defined by their surfaces 52, 54 can be created with a single machine set-up. This assembly design and fabrication technique eliminates the tolerance accumulation associated with the assembly of separate upper and lower female cones into a single hub with a single unitary hub being substituted. Furthermore, since the component manufacturing operation is done in a single machine set-up, there is no error associated with rechucking the hub between two separate fabrication operations. Therefore, the highly precise dimensions of the cones can be achieved. Finally, either the part being cut, or the cutting tool can move in forming the female conical surfaces.

Figure 6:
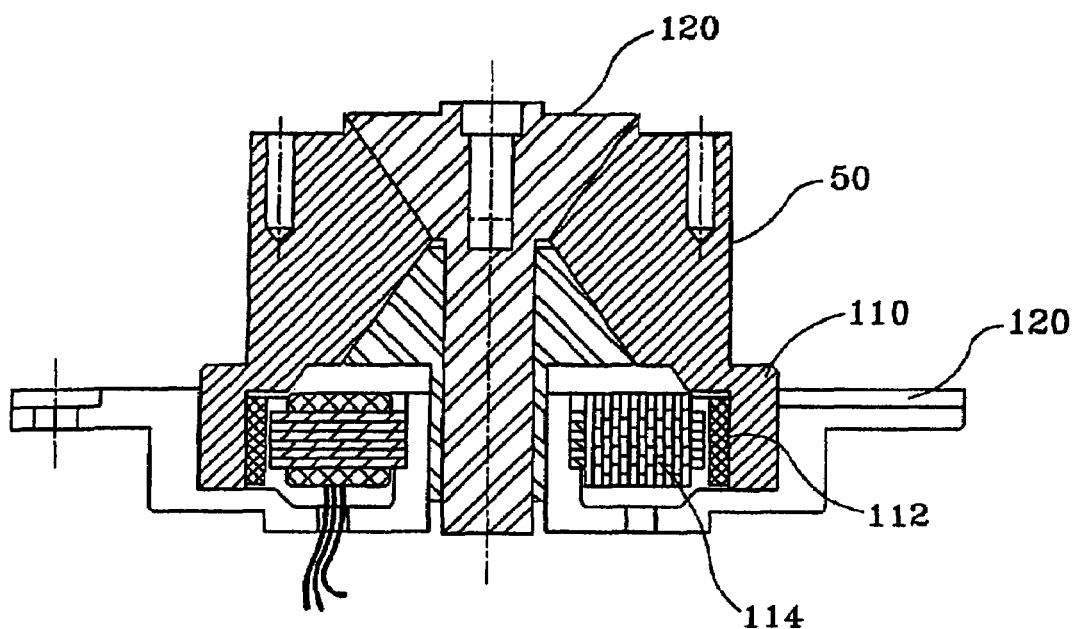
FIG. 6 shows the integrated hub comprising the upper and lower female cones, the upper male shaft/cone and the lower male shaft/cone all integrated into an exemplary motor in which the fluid dynamic bearing is useful.

This approach using a single unitary hub can be used to establish either a rotating hub, rotating about a fixed shaft, or a fixed hub with a rotating shaft. For example, referring back to FIG. 2, it can be seen that hub 50 of FIG. 2 includes a disk support ledge 100, so that the hub as it rotates about the integrated shaft 10, 14 can support one or more disks for rotation. In contrast, in FIG. 6 a complete motor is shown incorporating the unitary hub 50 of the present invention with a extended portion 110 of the hub supporting a magnet 112 which cooperates with a stator 114 to drive a motor. The same external portion 110 of the hub 50 rotates within a recess in base 120 which may be incorporated into a disc drive or the like. A disc support surface can be provided on the hub.

Other features and advantages of the present invention may become apparent to a person of skill in the art who studies this disclosure. Therefore, the scope of the invention is to be limited only by the following claims.

What is claimed is:

1. A method of forming a hub for use in a disk drive motor, comprising:

providing a hub structure having opposite first and second surfaces, the hub structure having formed therein a first conical void and a second conical void, the first conical void and the second conical void each having a wide opening and a narrow opening and formed in the hub structure so that the narrow openings meet at a center opening, the wide opening of the first conical void is formed at the first surface, and the wide opening of the second conical void is formed at the second surface;

providing, from the wide opening of the first conical void, a cutting tool having an outer radial surface for machining the inner surfaces of the first conical void and the second conical void, wherein relative dimensions of the cutting tool and the center opening allow the cutting tool, when the outer radial surface of the cutting tool is positioned against the inner surface of the first conical void, to traverse the center opening on a path parallel to an axis of rotation of the cutting tool; and machining the inner surfaces of both the first conical void and the second conical void while maintaining the providing of the cutting tool from the wide opening of the first conical void.

2. The method of claim 1, wherein a width of the cutting tool is less than or approximately equal to an aperture presented by the center opening at an angle defined by a projection of the inner surface of the first conical void through an axial center of the center opening.

3. The method of claim 1, further comprising providing the hub structure as a rotatable structure about a fixed shaft.

4. The method of claim 1, further comprising providing the hub structure as a fixed hub for a rotating shaft.

5. The method of claim 1, wherein when the traversal of the cutting tool occurs, the inner surface of the first conical void is becomes a machined surface.

6. A method of forming a hub for a disc drive motor, comprising:

providing a hub structure having opposite first and second surfaces;

forming a first conical void and a second conical void in the hub structure, the first conical void having a wide opening formed at the first surface, the second conical void having a wide opening formed at the second surface, and respective narrow openings of the first conical void and the second conical void connectedly formed within the hub structure to provide a central opening connecting the first conical void and the second conical void;

providing a machining tool from a wide opening of the first conical void;

machining an inner surface of the first conical void; and machining an inner surface of the second conical void by passing the machining tool through the central opening to reach the inner surface of the second conical void.

7. The method of claim 6, wherein the machining of the inner surface of the second conical void comprises passing the machining tool through the opening in a direction parallel to an axis of rotation of the machining tool.

8. The method of claim 6, wherein the machining of the inner surfaces of the first and second conical voids provides respective machined inner surfaces and a central opening of a size allowing passage of the machining tool without further cutting of material from the hub structure.

9. The method of claim 6, wherein the providing of the machining tool comprises determining a radius of the machining tool based on a desired angular aperture size presented by the opening for allowing the passing of the machining tool.

10. The method of claim 9, wherein the radius of the machining tool is determined to allow the machining tool to contact the inner surface of the first conical void at a first point and to contact the inner surface of the second conical void at a point approximately radially opposite the first point without moving the machining tool except in a direction parallel to an axis of rotation of the machining tool.

11. The method of claim 6, wherein the inner surface of the first conical void is machined by the machining tool by moving the machining tool in a direction perpendicular to an axis of rotation of the tool while maintaining contact with the inner surface of the first conical void.

12. The method of claim 6, wherein the inner surface of the second conical void is machined by the machining tool by moving the machining tool in a direction perpendicular to an axis of rotation of the tool while maintaining contact with the inner surface of the second conical void.

13. A method of forming a hub with dual fluid dynamic bearing surfaces, for use in a disc drive motor, comprising:

providing a hub structure having opposite first and second surfaces with rough first and second inner conical surfaces; and machining the first and second inner conical surfaces with a tool provided only from the first surface, wherein the first inner conical surface is machined to have a wide opening at the first surface, the second inner conical surface is machined to have a wide opening at the second surface, and respective narrow openings of the first inner conical surface and the second inner conical surface are machined to meet at a center opening.

14. The method of claim 13, wherein the machining comprises moving the tool in a pattern to machine the first inner conical surface and the second inner conical surface.

15. The method of claim 13, wherein the machining comprises moving the first hub structure in a pattern to define the first inner conical surface and the second inner conical surface.

16. The method of claim 13, further comprising providing the hub structure as a rotatable structure about a fixed shaft.

17. The method of claim 13, further comprising providing the hub structure as a fixed hub for a rotating shaft.

18. The method of claim 13, wherein the center opening has a substantially circular cross-section after the machining.

19. The method of claim 13, wherein the machining comprises moving the tool without substantially changing an angle defined by an axis of rotation of the tool and an axial center of the first inner conical surface.

* * * * *